United States Patent [19]
Bloomer

[11] 4,421,993
[45] Dec. 20, 1983

[54] LOAD RESISTANCE CONTROL CIRCUITRY

[75] Inventor: Milton D. Bloomer, Scotia, N.Y.

[73] Assignee: General Electric Company, Schenectady, N.Y.

[21] Appl. No.: 382,875

[22] Filed: May 28, 1982

[51] Int. Cl.³ .............................................. H01H 47/00
[52] U.S. Cl. .................................... 307/126; 307/140; 219/499; 363/79; 315/308
[58] Field of Search ..................... 307/31, 32, 35, 126, 307/130, 131, 152, 140; 323/209, 210, 211, 369, 905; 363/79; 315/307, 308, 309; 219/497, 499, 501

[56] References Cited
U.S. PATENT DOCUMENTS

| | | | |
|---|---|---|---|
| 3,924,102 | 12/1975 | Hanekon | 219/497 |
| 4,162,379 | 7/1979 | Sebens et al. | 219/497 |
| 4,167,037 | 9/1979 | Moerman | 363/79 |
| 4,326,245 | 4/1982 | Saleh | 363/79 |

Primary Examiner—Joseph W. Hartary
Assistant Examiner—D. Jennings
Attorney, Agent, or Firm—Geoffrey H. Krauss; James C. Davis, Jr.; Marvin Snyder

[57] ABSTRACT

A load resistance control circuit compares the actual value of a non-zero temperature coefficient load resistance to a desired load resistance magnitude, and generates a control signal varying as a function of the deviation of the actual load resistance from the desired resistance. A fixed portion of each of the load voltage and load current are sampled and compared to references, set such that the sampled portions will each be equal to an associated reference value, at the same time, if the load resistance is of the desired magnitude. An analog comparator can be used to add or remove charge to or from an integrating capacitor responsive to the actual load resistance being different from the desired load parameter. In a digital embodiment, a counter is incremented or decremented responsive to the actual load resistance differing from a desired value. The capacitor voltage or digital count then is used to affect a load resistance change, as, e.g. by establishing the time during which an additional load current, added to a constant load current, is allowed to flow through the load to change the load resistance. The constant load current and additional load current values are selected such that normal load operation requires at least some flow of additional load current, to place normal load current within the operational range of the load resistance control circuit.

28 Claims, 20 Drawing Figures

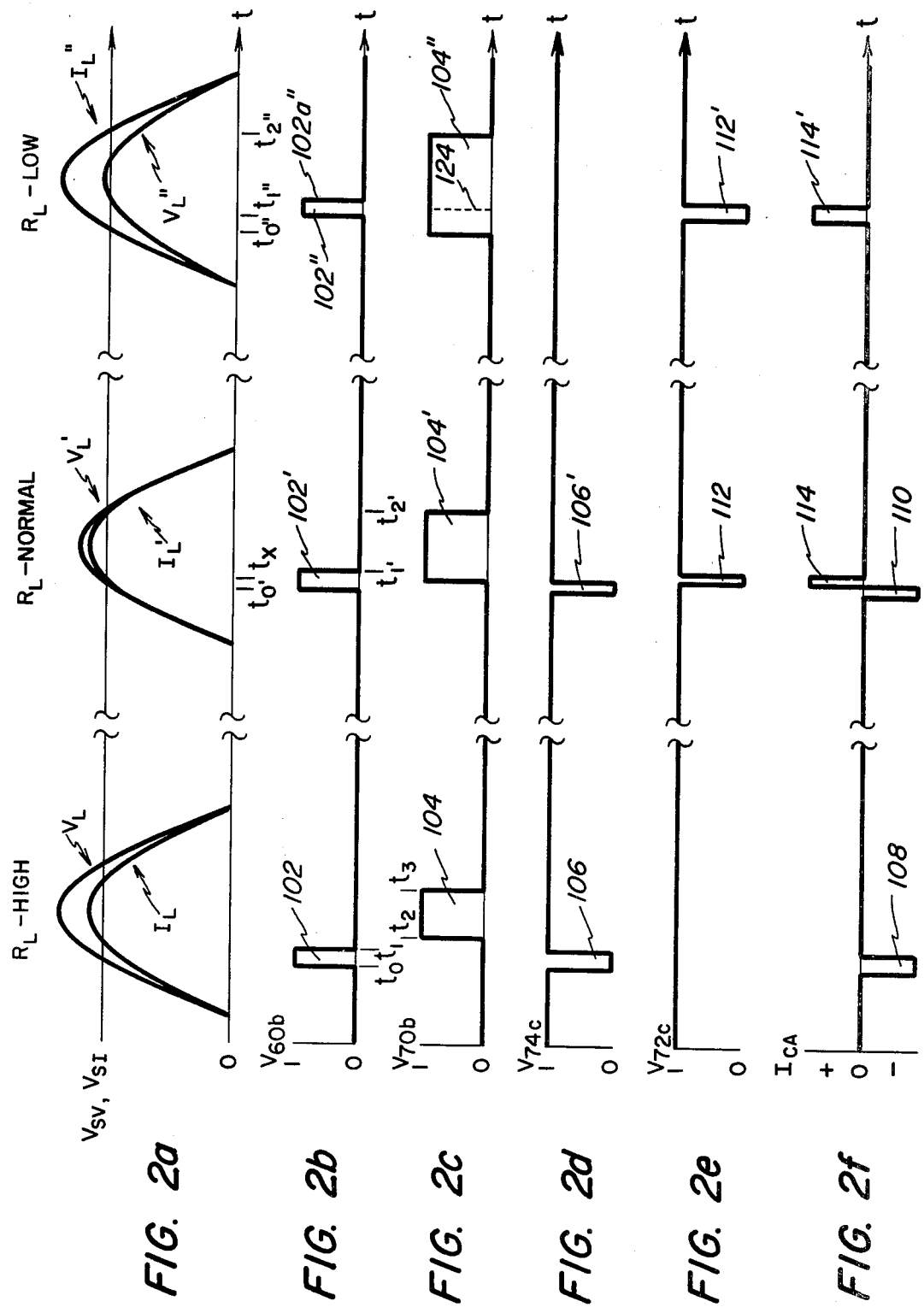

LOAD RESISTANCE CONTROL CIRCUITRY

BACKGROUND OF THE INVENTION

The present application relates to load control methods and apparatus and, more particularly, to novel apparatus and methods for controlling a load resistance, such as a heating element, an incandescent lamp and the like load, to have a desired magnitude, thereby to control filament temperature and the like.

It is often desirable to control the resistance of a load having a non-zero temperature-coefficient load resistance. Such loads include, but are not limited to, radiant heaters, cooking and baking appliances and incandescent lamps. The load may be a low-voltage load operated from a relatively higher voltage A.C. source. For example, there exists a class of low-voltage (24–36 volts) lamps having an improved efficacy due to operation of the lamp filament at a higher temperature than has been traditionally utilized for lamp operation. Because of the higher temperature operation, it is highly desirable to carefully control lamp filament temperature to assure both a controlled light output and reasonable lamp life. As the filament temperature is a function of the lamp resistance (which has a non-zero temperature coefficient) the lamp temperature may be controlled by controlling the load lamp resistance. The lamp may be operated from the commercial A.C. power mains, having a nominal 120 volt r.m.s. value, in residential and commercial operations. Because the voltage desired across the load is lower than the mains voltage, a highly efficient low-voltage power supply is required for energizing the lamp. One such power supply, using a dynamic switched-capacitor configuration, is described and claimed in co-pending application Ser. No. 379,393 filed May 18, 1982 assigned to the assignee of the present invention, and incorporated herein in its entirety by reference. The embodiment of low-voltage incandescent lamp power supply described in detail therein allows for open-loop establishment of the lamp load current (and therefore lamp load voltage, for a particular lamp having a particular resistance at a specified current level, and load power). It is highly desirable to be able to monitor the lamp filament resistance and to provide for closed-loop control of the lamp temperature responsive to variations in such resistance. It is also desirable to provide apparatus and methods for controlling the resistance of other loads having a non-zero temperature coefficient.

BRIEF SUMMARY OF THE INVENTION

In accordance with the invention, the voltage across and current flowing through a load resistance having a non-zero temperature coefficient, such as in an incandescent low-voltage lamp and the like, are both sampled at a time corresponding to a discrete non-zero point in one of the voltage and current waveforms. If the load resistance is higher than the desired resistance, the sampled voltage will reach a fixed threshold level before the sampled current reaches a threshold level fixed therefore; if the load resistance is lower than the desired resistance, the sampled voltage reaches the fixed threshold level after the sampled current reaches its fixed threshold level. A pair of signals result, indicative of the time at which each of the load voltage and load current reach the associated fixed threshold level, and these signals are utilized for incrementally varying the load voltage and/or load current on a cycle-by-cycle basis to maintain a predetermined load resistance.

In presently preferred embodiments, reference and load-related signal levels to a pair of comparators are set such that both comparators change output state substantially at the same time when the load voltage and current (and therefore load resistance) are at the desired magnitudes. As the load resistance changes from the nominal value, one of the load voltage or load current comparators is caused to change output state prior to an output change at the other comparator, thereby generating a flow of current into, or out of, a capacitor. The change in capacitor voltage changes the time interval during which an additional load current is added to a fixed load current, during each source waveform cycle, to vary the load parameters toward the predetermined values. The output of a latch is set, to begin providing additional current to the load, responsive to a first event, such as a load voltage or current waveform zero crossing, with the latch being reset to terminate the additional flow of load current when a ramp voltage, begun at the start of the additional current flow in each cycle, becomes equal to the voltage across an integrating control capacitor. The voltage across the control capacitor is varied by gating current pulses thereto, of width varying in accordance with the threshold-crossing times of comparators monitoring the load voltage and current. The comparators may operate from a common reference voltage, or from different reference voltages, with at least one of the comparators having a voltage or current divider utilized therewith for setting the comparator thresholds such that the comparators change state at the same time for a load operating under predetermined conditions. Hysteresis may be introduced into one of the comparators to prevent improper cycling of the load parameters at, or near, the desired normal magnitudes thereof. Rate-feed-forward circuitry may be utilized with a split integrating capacitor to provide improved control for sudden changes in source waveform magnitude.

In other embodiments, the analog capacitance subcircuit is replaced by a digital counting circuit, determining the duration of additional load current enablement responsive to a count which is incremented or decremented responsive to the relative durations of pulses appearing when actual load current and voltage are greater than load current and voltage reference levels.

Accordingly, it is one object of the present invention to provide novel apparatus for controlling the magnitude of a load resistance in closed-loop manner.

It is another object of the present invention to provide a method for closed-loop control of load resistance magnitude.

These and other objects of the present invention will become apparent upon consideration of the following detailed description, when read in conjunction with the drawings.

BRIEF DESCRIPTION OF THE DRAWINGS

FIGS. 2a–2f are a set of coordinated graphs illustrating the waveforms at various points in the circuit of FIG. 2 for lamp filament resistance in the high, normal and low conditions, and useful in understanding operation of the circuit;

DETAILED DESCRIPTION OF THE INVENTION

Figure 1:
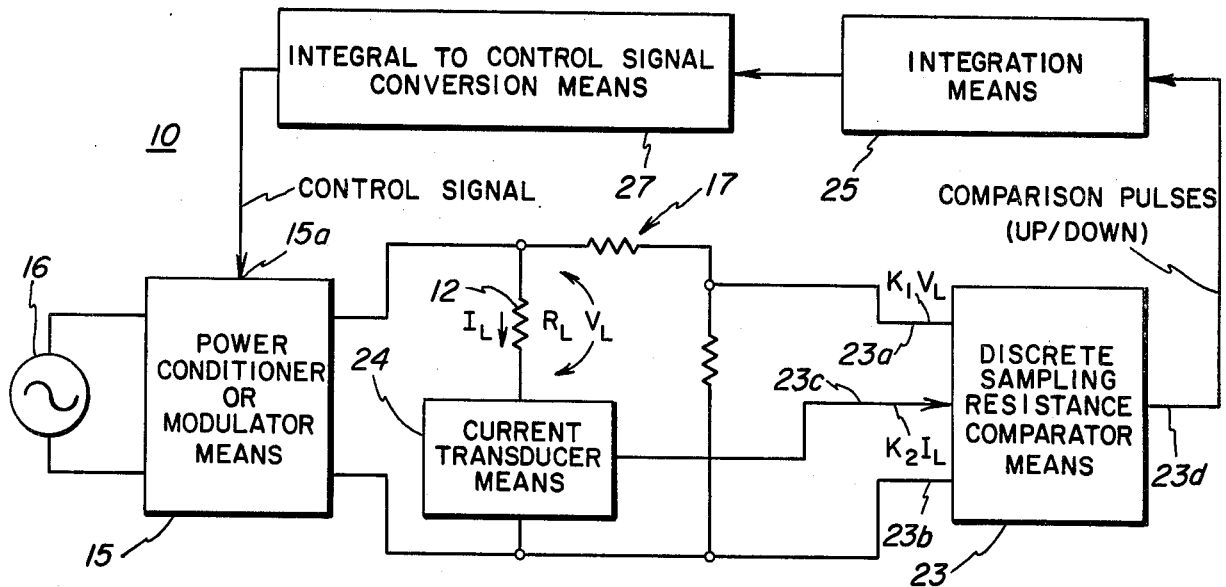
FIG. 1 is a block diagram of a load resistance control circuit in accordance with the principles of the present invention.

Referring initially to FIG. 1, a circuit 10 for controlling the resistance $R_L$ of a load 12, provides a controlled load current $I_L$, resulting in a controlled load voltage $V_L$, from a power conditioner or modulator means 15 connected between load 12 and an A.C. power source 16. The resulting load voltage $V_L$ appears across the input of a voltage divider 17, at the output of which is provided a scaled load voltage of magnitude $K_1 V_L$, where $K_1$ is a constant less than one. The scaled load voltage appears at a first input 23a, with respect to a common input 23b, of a discrete sampling resistance comparator means 23. A second input 23c receives a scaled load current signal, of magnitude $K_2 I_L$, with $K_2$ being a constant less than one and with respect to common line 23b, from a current transducer means 24 in series with load 12. A discrete sampling resistance comparator means output 23d provides a signal when the load current and voltage (defining load resistance $R_L$) vary from predetermined norms. The comparator output signal, e.g. a set of comparison pulses, indicates whether the load current must be increased (moved "up") or decreased (moved "down"). The pulsed comparator output signal is integrated with respect to time in integration means 25 and converted, in an integral-to-control signal conversion means 27, to provide a control signal to the power conditioner to modulator means control input 15a. The control signal at input 15a causes a variation in load current to occur, in the direction required to maintain the resistance of load 12 substantially at the predetermined value.

Referring now to FIGS. 2 and 2a–2f, a first preferred embodiment of load control circuit 10 acts to generate an "up" pulse, adding a quantum of charge to a capacitance 11 when a first sensed load parameter (load voltage) is less than a second sensed load parameter (sensed load current), and acts to generate a "down" pulse, removing a similar quantum of charge from capacitance 11 when the first sensed load parameter is greater than the second sensed load parameter. Storage element 11 therefore acts as a discrete form of integrator means 25, having what appears to be infinite D.C. gain and a voltage thereacross related to the magnitude and polarity of the change in load voltage and/or current required to cause the load to resume operation at a predetermined level.

As described and claimed in the above-designated co-pending application, load 12, having a load resistance $R_L$ of predetermined magnitude of a particular operating condition, e.g. an incandescent lamp having a filament resistance $R_L$ at a predetermined operating temperature, is connected in series with a main capacitor 14, of capacitor value $C_1$, across an A.C. source 16, having a source voltage $V_S$. An auxiliary capacitor 18, having a capacitive value $C_2$ is selectively connected in shunt with main capacitor 14 by operation of either a power switching device 20 or a shunting diode 22. Thus, when both device 20 and diode 22 are non-conductive, the current flowing from source 16 through load 12 (and a sensing resistor 24, of small, e.g. 0.05 ohms, resistance $R_S$) is established by the capacitance of main capacitor 14. When device 20 is placed in the current-conductive condition, which commences only when the current $I_L$ through the load resistance is at a zero crossing, an additional current $I_S$ flows through auxiliary capacitor $C_2$ and the load current magnitude is the sum of the main and auxiliary capacitor currents, i.e. $I_L = I_1 + I_2$. If the voltages across the main and auxiliary capacitors 14 and 18 are such that diode 22 conducts, the diode current $I_D$ flows through auxiliary capacitor 18 and also adds current $I_2$ to the main capacitor current $I_1$ to provide the total load current $I_L$. The load current, and therefore the load voltage and power (and, if the load is an incandescent lamp, the lamp filament temperature), are variably dependent upon the time interval during which each of switching device 20 or diode 22 is conductive. Diode 22 will conduct for a different portion, but of essentially the same duration, as the portion during which device 20 conducts. Accordingly, by turning the power switching device, e.g. a field-effect transformer (FET) 20, on at a source voltage peak (i.e. a load current zero crossing) and thence turning off the FET at an appropriate time in the cycle, the desired level of load lamp voltage $V_L$ and lamp current $I_L$ are provided. Device 18 is controlled by the gate voltage $V_g$ provided to the gate electrode thereof through a limiting resistor 26.

Source 16 is connected to source nodes A and C of circuit 10, with a third, or common node B, providing a common ground for the circuit. Circuit 10 includes a logic operating potential power supply 28, including a current-limiting resistor 28a in series connection with a rectifier diode 28b and a filter capacitor 28c, connected between nodes A and B. The operating potential $+V$ is taken across capacitor 28c, with respect to common ground node B.

The switching device gate voltage $V_g$ is provided at the output 30a of the reset-set latch logic element. Latch 30 receives operating potential by connection between the $+V$ source and common ground potentials. The latch output 30a is set, at each source voltage negative-going zero crossing, by an appropriate level at a set S input 30b thereof, and is reset by a signal appearing at the reset R input 30c. Advantageously, a type 7555 integrated circuit timer element is utilized as latch 30.

The set S input signal is obtained, from the voltage across device 20, by means of a hard-limiting comparator circuit 32, utilizing a first comparator 34 having its non-inverting input 34a connected to common ground and an inverting input 34b connected through a resistance 35 to device 20. Limiting diodes 36 and 38 are connected from input 34b to common and operating potentials, respectively, and are poled to substantially prevent application to input 34b of a voltage less than ground potential or greater than operating potential +V. The comparator output 34c is connected through a resistance 40 to operating potential +V and through a coupling capacitor 42 to set S input 30b. The set S input operating voltage is established by means of a first resistance 44 connected from the set S input to operating potential +V and by a second resistance 46 connected from input 30b to common ground. Thus, comparator output 34 changes state at the positive-going zero crossing of the drain-source voltage of the FET and produces a negative-going pulse to trigger R/S latch 30.

The lamp voltage $V_L$ is compared, in another comparator circuit 48, to a first substantially-constant voltage $V_{SV}$, derived from the operating voltage +V by means of a voltage divider 50, comprised of resistors 50a and 50b. The substantially-constant reference voltage $V_{SV}$ is coupled to the non-inverting input 52a of a second comparator 52. The inverting input 52b of the second comparator is connected to the output junction of another voltage divider 54, comprised of a first resistance 54a (connected between comparator input 52b and common ground) and a second resistance 54b (connected between input 52b and the cathode of a diode 56). The anode of diode 56 is connected to node A. The second comparator output 52c is connected through a pulse-forming network 58, comprised of a timing resistance 58a in parallel with a timing capacitance 58b, to the input 60a of a first inverter 60. A resistance element 62 is connected, as a pull-up load, from inverter input 60a to potential +V. A positive-going pulse (FIG. 2b) is formed at the first inverter output 60b each time that the positive-going load voltage $V_L$ becomes greater than the substantially-constant reference voltage $V_{SV}$; the first inverter output pulse has a time duration established by the resistance and capacitance values of pulse-forming network resistor 58a and capacitor 58b.

The load current $I_L$ is transformed to a voltage across sensing resistor 24; another comparator circuit 64 provides another positive-going pulse whenever the sensing resistance voltage (proportional to the load current) exceeds another substantially-constant reference voltage $V_{SI}$. The inverting input 66a of a third comparator 66 is connected to the junction between load resistance 12 and sensing resistance 24. The non-inverting input 66b of third comparator 66 receives the substantially-constant second reference potential $V_{SI}$, at the output of another voltage divider 68, comprised of resistors 68a and 68b, connected between operating potential +V and the common ground. The third comparator output 66c is connected to operating potential +V through a resistor 68, and also to an input 70a of another inverter 70. Thus, a positive-going pulse, of logic 1 level, is provided at inverter output 70b (FIG. 2c) whenever the sensing resistance voltage, proportional to the load current $I_L$, exceeds second substantially-constant voltage $V_{SI}$. It should be understood that, while the two substantially-constant voltages $V_{SV}$ and $V_{SI}$ are shown as being essentially equal in FIG. 2a, each substantially-constant reference voltage may be of differing magnitude from the other, as required by a particular control circuit design. It is desirable that the outputs of comparator circuits 48 and 64 change state substantially simultaneously for a load operating at a predetermined "normal" level.

The first inverter output 60b is connected to one input 72a and 74a of each of two-input NAND gates 72 and 74. The remaining input 72b of gate 72 is connected to the output 70b of second inverter 70. The remaining input 74b of gate 74 is connected to the third comparator output 66c. Gate output 74c is connected through a drive resistor 76 to the base electrode of a first transistor 78, while gate output 72c is connected through a drive resistor 80 to the base electrode of a second transistor 82. The emitter electrode of NPN first transistor 78 is connected to common ground, while the collector electrode thereof is connected to a collector resistor 84 to operating potential +V and to the base electrode of a third transistor 86. The NPN third transistor emitter electrode is connected to common ground and the collector electrode thereof is connected through a discharge resistor 88 to capacitor 11. The emitter electrode of PNP transistor 82 is connected to operating potential +V and the collector electrode is connected through a charge resistor 90 to capacitor 11 (having a capacitive value CA). The non-grounded terminal of capacitor 11 is connected to the inverting input 92a of a fourth comparator 92. The non-inverting input 92b of the fourth comparator is connected: to the anode of a diode 94, having its cathode connected to the flip-flop output 30a; to one terminal of an auxiliary capacitance 96, having the other terminal thereof connected to common ground; and to the collector electrode of a PNP transistor 98a, forming the output of a current source 98. The current source transistor 98a has an emitter electrode connected through a current-setting resistor 98e to operating potential +V and a base electrode connected to the emitter electrode thereof through a pair of diodes 98b and 98c and also connected through a resistance element 98d to common ground. The fourth comparator output 92c is connected to operating potential +V through a pull-up resistance 100 and also to the flip-flop reset input 30c.

In operation, if the lamp resistance $R_L$ is higher than desired, the lamp voltage will be higher than desired (the left-most case in FIGS. 2a–2f), even if the load current magnitude is nominal. Accordingly, as the source voltage approaches its positive-polarity peak value, the lamp voltage $V_L$ will become equal to thd first reference voltage $V_{SV}$ at some time $t_0$ (FIG. 2a). Comparator 52 changes state and a logic 1 output pulse 102 is provided at first inverter output 60b (FIG. 2b). The first inverter output voltage returns to the logic 1 level at some time $t_1$. At some time $t_2$ thereafter, the lamp current $I_L$ causes the sensing resistance voltage to exceed the second substantially-constant reference potential $V_{SI}$ and the output of comparator 66 changes state. The second inverter output 70b goes to the logic 1 level and remains thereat until a time $t_3$, when load current $I_L$ reduces the sensing resistance voltage to again be equal to reference potential $V_{SI}$. The inverter 70b output pulse 104 is thus provided (FIG. 2c).

At a time immediately prior to time $t_0$, the first input 72a of gate 72 was at a logic 0 level. The gate output 72c was therefore at a logic 1 level (FIG. 2d). When the inverter output 60b rises to a logic 1 level, at time $t_0$, the level at gate input 74b is already at a logic 1 level, due to the logic 0 level at third comparator output 66c. Gate output 74c therefore falls to the logic 0 level and provides a negative-going pulse 106 with the same duration as pulse 102, i.e. returning to the logic 1 level at time $t_1$. At time $t_2$, the leading edge of pulse 104 occurs, but the output of gate 74 has already returned to, and stays at, the logic 1 level because of the logic 0 level at input 74a. Therefore, pulse 104 has no effect on the signal at gate output 74c. As the input 72a of gate 72 has already returned to the logic 0 level, the output 72c thereof (FIG. 2e) remains at the logic 1 level during pulse 104; therefore, transistor 92 remains cut-off biased and current does not flow through resistor 90 into capacitor 11. However, responsive to the negative-going pulse 106 at gate output 74c, first transistor 78 is temporarily removed from saturation into cut-off, and third transistor 86 is temporarily pulsed from cut-off into saturation. A pulse 108 (FIG. 2f) of current flows from capacitor 11, through saturated transistor 86, reducing the voltage across capacitor 11.

While the foregoing reduction in the voltage across capacitor 11 is taking place, the first comparator circuit 32 senses that the device 20 voltage polarity has become positive (which occurs substantially at the load current zero crossing) and sets the output 30a of the latch. When the latch had previously been reset, output 30a was connected to ground potential through a small resistance, whereby the voltage across capacitor 96 is discharged through diode 94 and the latch output-reset resistance. The setting of latch output 30a reverse-biases diode 94, whereby capacitor 96 begins to charge from current source 98. The latch remains set until reset by a logic 1 level at the output 92c of the fourth comparator, which logic 1 level occurs when the voltage across capacitor 96 has charged to a magnitude equal to the voltage across capacitor 11. While the latch remains set, a gate voltage is present at output 30a, turning on device 20. As the voltage across capacitor 11 is reduced when transistor 86 is saturated, the amount of time during which device 20 is in the conductive condition is lowered, responsive to the one quanta of charge removed from capacitor 11. Therefore, the load current is reduced by one "step," reducing the load voltage (and load lamp temperature). If additional reduction in load current (and voltage) is still required, additional discharging of capacitor 11 quanta occurs on each of subsequent source waveform cycles. Thus, additional discharge pulses 108 will occur, further reducing the voltage across capacitor 11 and the time during which switching device 20 is operative during each source waveform cycle. Eventually, the load current is reduced in value to provide a "normal" load voltage $V_L$.

For normal load resistance (the middle of three illustrated conditions in FIGS. 2a–2f), the reduced load voltage $V_L'$ (from divider 54) is set to become equal to the first reference voltage $V_{SV}$ at substantially the same time that the load current $I_L'$ provides a voltage across sensing resistance 24 which is equal to the second reference potential $V_{SI}$. Therefore, at time $t_0'$, inverter output 60b provides a logic 1 positive-going pulse 102' which returns to the logic 0 level at time $t_1'$. The current comparator circuit 64, however, causes inverter output 70b to provide a positive-going pulse 104' having a leading edge at a time $t_x$, while pulse 102' is still present. Gate output 74c goes to the logic 0 level in response to the leading edge of the logic 1 pulse 102', but is reset to the logic 1 level when comparator output 66c goes to the logic 0 level at time $t_x$; a relatively narrow, negative-going logic 0 pulse 106' therefore appears at gate output 74c, and discharges capacitor 11 during the time interval $t_0'-t_x$. Immediately after this relatively-narrow discharge pulse 110, transistor 86 returns to the cut-off condition, but transistor 82 is placed in the saturated condition. This occurs responsive to logic 1 levels being present at both inputs 72a and 72b of gate 72. A logic 0 level pulse 112 occurs at gate output 72c, placing second transistor 82 in saturation, whereby current flows through resistor 90 and provides a pulse 114 of charging current into capacitor 11. As discharge pulse 110 and charge pulse 112 are of approximately equal duration, the voltage across capacitor 11 does not appreciably change. Therefore, the auxiliary capacitor 18 current $I_2$ conduction time, after a voltage zero crossing at which comparator 92 resets latch 30, will not change on a cycle-by-cycle basis, and the load current (and therefore load voltage, load resistance and load lamp filament temperature) remains essentially constant.

In the case (illustrated at the right of FIGS. 2a–2f) where the load resistance is lower than desired, the load current $I_L''$ provides a sensing resistance voltage which exceeds the second reference potential $V_{SI}$ before the load voltage $V_L''$ exceeds the first reference potential $V_{SV}$. Further, the sensing resistance voltage is greater than second reference potential $V_{SI}$ for a longer period of time than the load voltage is greater than first reference potential $V_{SV}$, in each source waveform cycle. At time $t_0''$, when the sensing resistance voltage due to load current $I_L''$ exceeds the reference potential $V_{SI}$, comparator 64 acts to provide a logic 1 level at inverter output 70b (FIG. 2c). This logic 1 level remains until time $t_2''$, when the load-current-induced voltage across the sensing resistance again falls below the second reference potential $V_{SI}$. The inverter output 70b logic 1 level pulse 104'' thus commences prior to commencement of the positive-going inverter output 60b pulse 102'', which commences at time $t_1''$ when the source voltage $V_L''$ exceeds the first reference potential $V_{SV}$. Therefore, at time $t_0''$, the level at gate 74 first input 74a is a logic 0, while input 74b has a logic 1 level thereat. The gate output 74c remains at a logic 1 level, preventing discharge of current from capacitor 11. Simultaneously therewith, the second input 72b of gate 72 falls to a logic 0 level, maintaining the logic 1 level at gate output 72c, to temporarily prevent charging of capacitance 11. However, at time $t_1''$, inverter output 60b provides positive-going pulse 102'' at a logic 1 level at gate input 72a, which combines with the logic 1 level previously provided at gate input 72b by output 70b, and gate output 72c falls to a logic 0 level (FIG. 2e). The gate output 72c logic 0 pulse 112' (having a fixed duration set by the pulse-forming network 58 of comparator circuit 48) saturates transistor 82 and causes a pulse 114' of charging current to flow into capacitor 11, raising the voltage thereacross. The zero crossing of the load current having set latch output 30a and caused additional source current $I_2$ to flow through now-conductive device 20, the voltage across capacitor 96 increases until equal to the now-increased voltage across capacitor 11. When the equality of the voltages across capacitors 11 and 96 is sensed by comparator 92, latch 30 is reset and the signal $V_g$ at the output 30a thereof is removed to cause conduction to cease in device 20. The amount of additional load current conducted through device 20 during the initial portion of each source waveform cycle (and for a substantially identical time interval at the end of each source waveform cycle, by action of diode 22) provides a total load current $I_L$ which increases on a cycle-by-cycle basis, until the power dissipated in the lower-than-normal load resistance is sufficient to set the time during which the load current is greater than the second reference potential to be substantially equal to the time during which the load voltage is greater than the first reference potential. The load current is therefore controlled to provide a load power maintaining load temperature at the required value.

Figure 2:
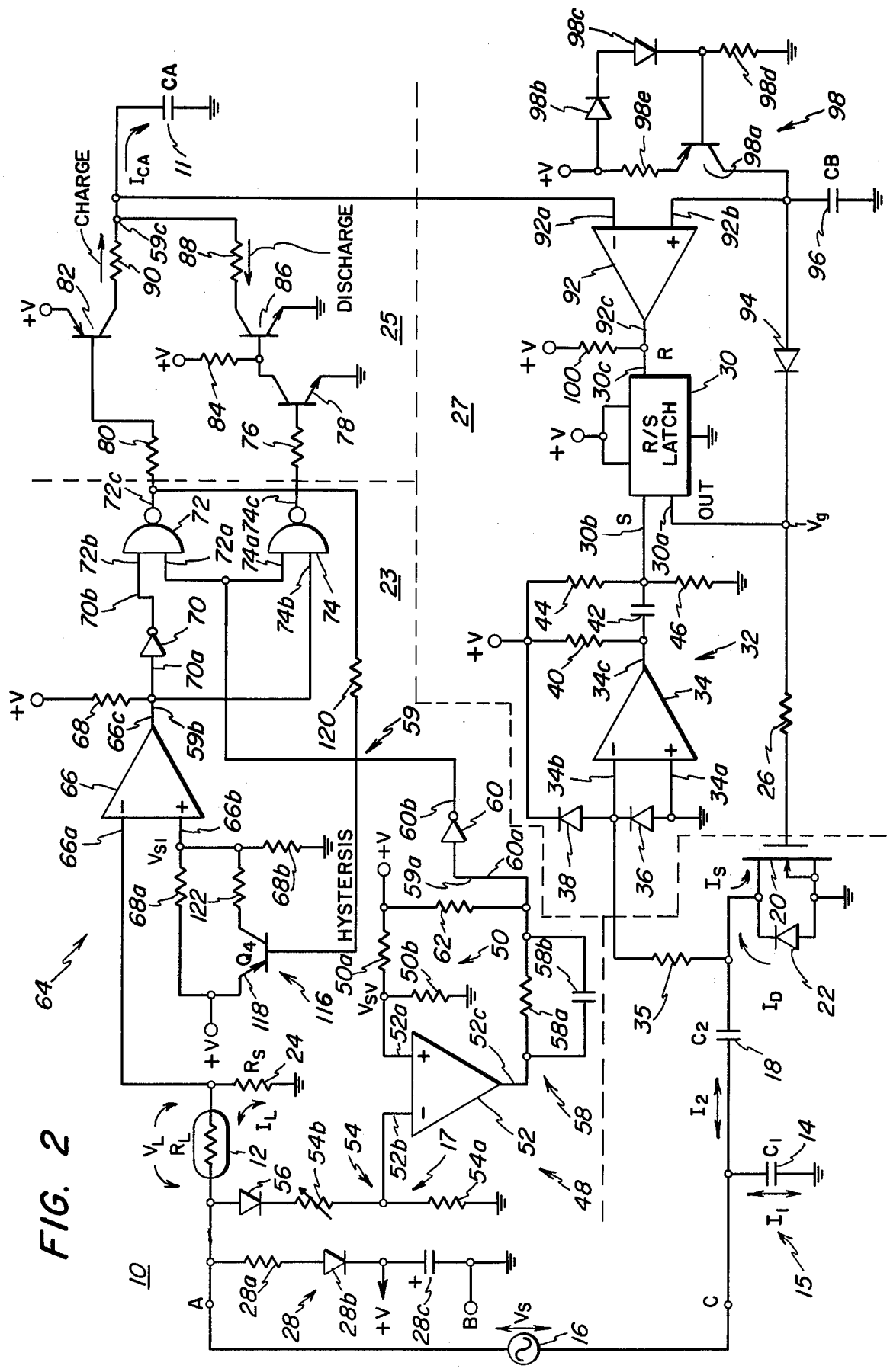
FIG. 2 is a schematic diagram of a first presently preferred embodiment of load lamp filament temperature controller, in accordance with the principles of the present invention.
Figure 4:
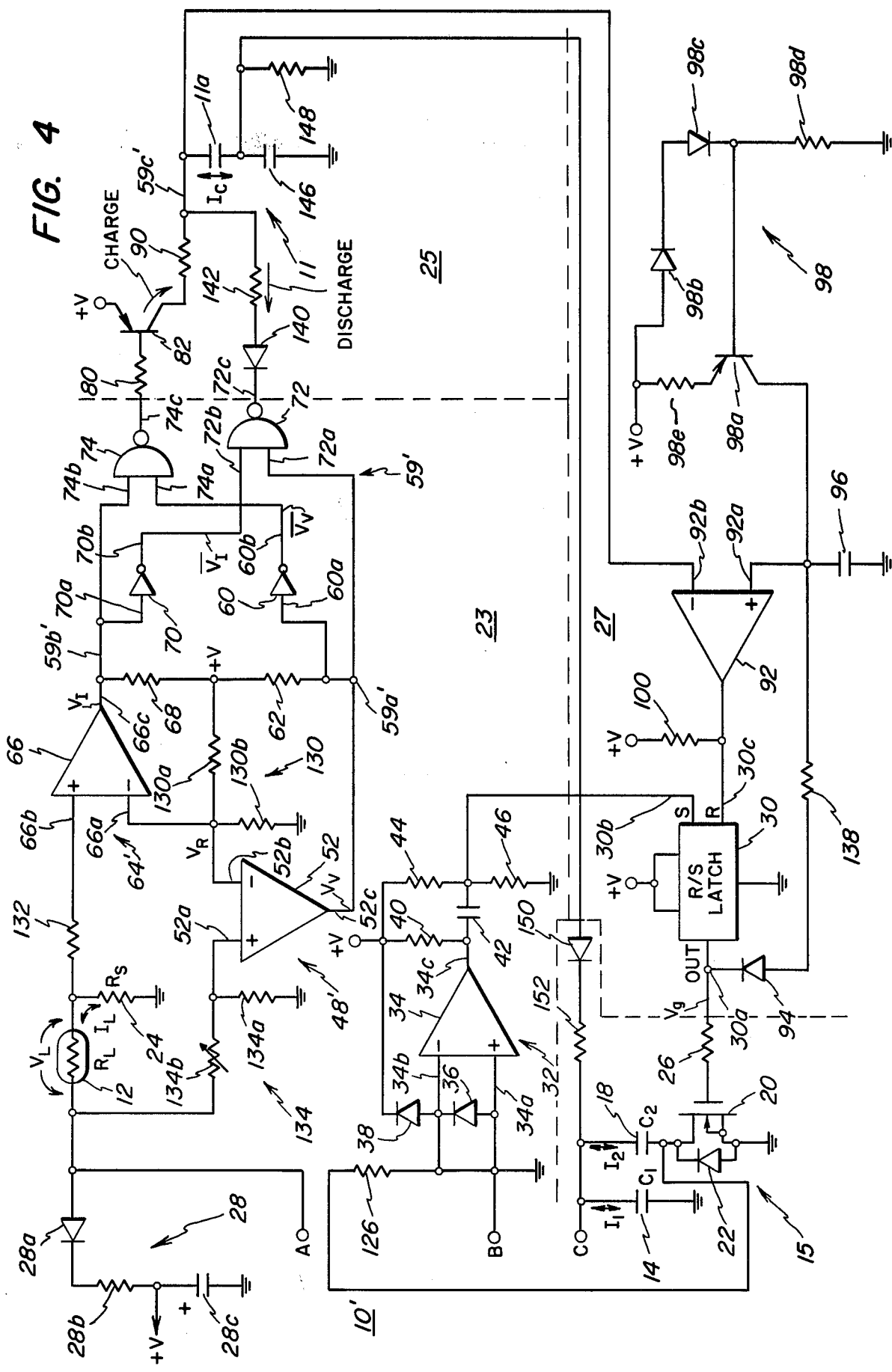
FIG. 4 is a schematic diagram of another presently preferred embodiment of incandescent lamp filament temperature controller.
Figure 4A:
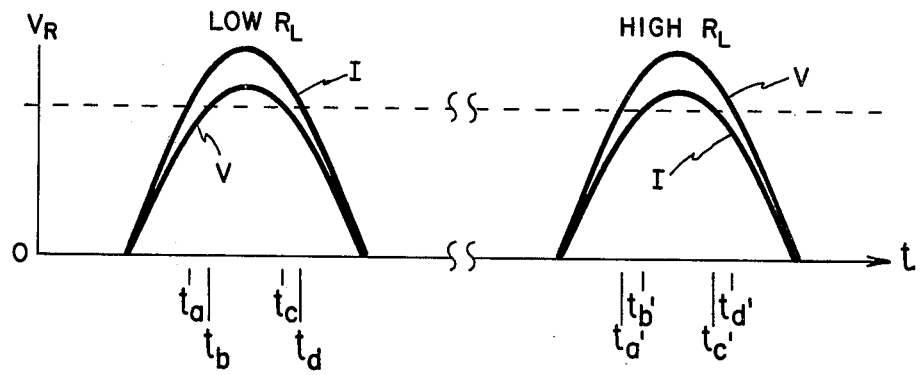
FIGS. 4a–4f are a set of coordinated graphs illustrating the waveforms in the circuit of FIG. 2 in the low and high load resistance conditions, and useful in understanding operation of the circuit.
Figure 4B:
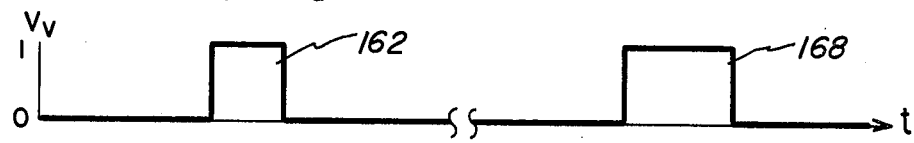
Figure 4C:
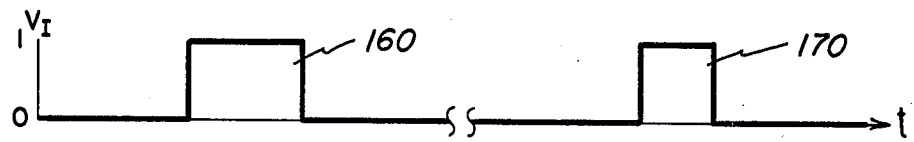
Figure 4D:
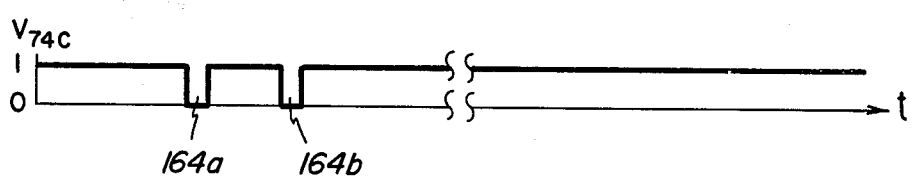
Figure 4E:
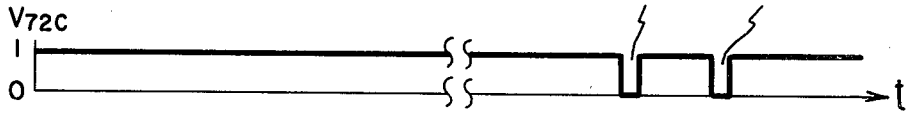
Figure 4F:
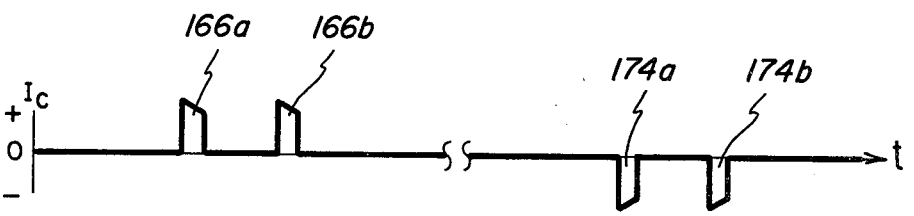

The circuit of FIG. 2 also includes a hysteresis circuit 116, serving to introduce a large hysteresis in the load current comparator circuit 64 to prevent creation of both a charge and discharge pulse of current into capacitor 11 at the same time. Circuit 116 includes a fourth transistor 118 having an emitter electrode connected to operating potential +V, a base electrode connected through a resistor 120 to the gate output 72c, and a collector electrode connected through a resistor 122 to the output of second reference potential divider 68 (at comparator non-inverting input 66b). The PNP fourth transistor 118 is saturated whenever gate output 72c is at a logic 0 level. This logic 0 level is not present if the load resistance $R_L$ is higher than normal. When a gate output 72c logic 0 level is present, transistor 118 saturates and places resistor 122 in parallel with resistor 68a, to reduce the second reference potential $V_{SI}$ magnitude. When this occurs responsive to negative-going pulse 112 in the normal resistance condition, the duration of inverter output 70b pulse 104' is increased; however, its inverter output 70b pulse 104' is increased; however, it will be seen that an increased pulse 104' duration does not increase the time during which current $I_{CA}$ charges capacitor 11. Similarly, in the lower-than-normal load resistance case, transistor 118 is saturated by pulse 112', and the lowered second reference potential value lengthens pulse 104" sufficiently such that, if comparator output 66c were to return to the logic 0 condition (as shown by broken trailing edge 124) at a time before the trailing edge 102a" of pulse 102", the duration of pulse 104" is sufficiently extended such that the logic 1 level remains present at inverter output 70b until inverter output 60b has returned to the logic 0 level, preventing a discharge pulse from removing charge from capacitor 11.

Thus, both the load voltage and current are sampled at a discrete point on the waveforms thereof and the time, in each source waveform cycle, at which the load voltage and load current exceed the discrete levels assigned thereto is utilized to change the voltage across a capacitor. The capacitor voltage is compared with a ramp voltage to vary the time during which an additional current is caused to flow through the load, thereby controlling, in closed-loop fashion, the load resistance (and, therefore, the load temperature) to a predetermined value thereof.

Figure 3A:
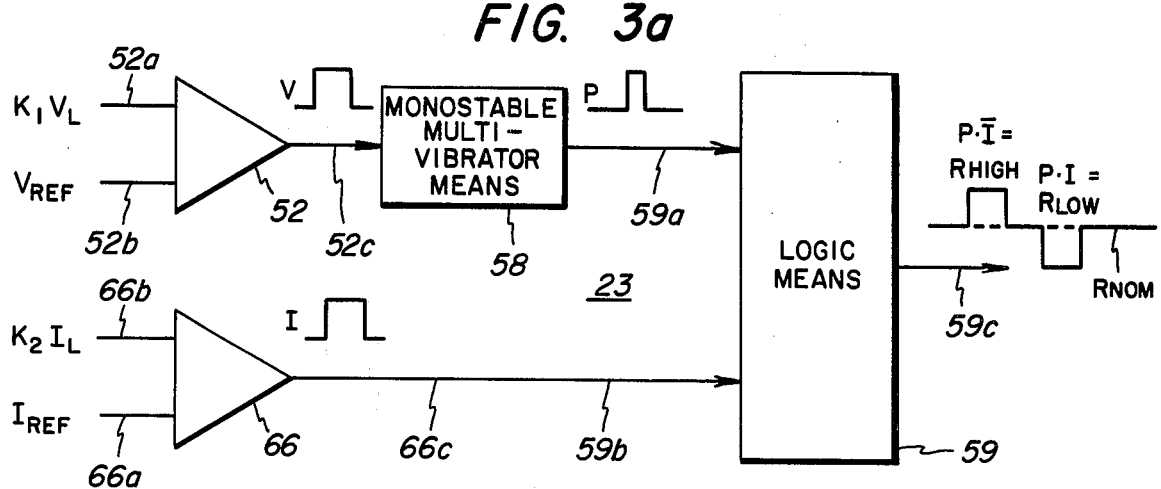
FIGS. 3a and 3b are block diagrams of analog discrete sampling resistance comparators, respectively for providing a fixed or variable width output pulse at each sample time.

It will be seen that the foregoing technique uses (as shown in FIG. 3a): a first comparator 52 to compare a representation of the load voltage, e.g. signal $K_1V_L$ (where $K_1$ is a constant less than 1) at a first input 52a against a voltage reference $V_{REF}$ at a second input 52b, to generate a V signal edge at a comparator output 52c, for subsequent generation of a pulse P waveform at the output of a monostable multivibrator means 58 for introduction at a first input 59a of logic means 59; a second comparator 66 to compare a representation of load current e.g. signal $K_2I_L$ (where $K_2$ is a constant less than 1) at an input 66b against a current reference $I_{REF}$ at another input 66a, for generation of a current I signal edge at a comparator output 66 for introduction into another logic means input 59b; and generation of a logic means output signal 59c having a state indicating whether the load resistance is higher than, lower than or equal to the nominal load resistance $R_{NOM}$ desired. The output signal will be a pulse of the same width as the pulse P from multivibrator means 58, and may be at: a first value for the nominal resistance; a magnitude greater than that first value if the load resistance is high; or a magnitude lower than the first value if the load resistance is low. This form of discrete sampling resistance comparator means 23 may be utilized for control of resistance (or temperature) of any resistive load with a non-zero temperature coefficient of resistance, such as incandescent lamps, radiant heaters and many other heating and cooking appliances. It is applicable to A.C. control systems or D.C. systems having residual or induced ripple and is thus applicable to any type of power control system, as a control signal can be generated as a form of voltage, current, frequency, pulse width modulation and the like, as a function of the deviation of the load resistance from a desired resistance. By dynamically sampling a fixed fraction of the load voltage and a fixed fraction of the load current, with the fixed fractions of each load parameter selected so that they will both be at some arbitrary reference value(s) at the same instant during normal periodic (or aperiodic) variation in load voltage and current provided by the power source, it can be ascertained if the resistance of the load is higher than desired (when the fixed fraction of load voltage crosses its reference point before the fixed fraction of the current crosses the current reference point) or that the resistance of the load is lower than desired (if the fixed fraction of the load current crosses the current reference point before the fixed fraction of the load voltage crosses the voltage reference point). By so sensing, logical signals can be formed to indicate the timing of the voltage or current crossing events and considerable amplification and/or integration of the resulting error signal may be utilized to turn on appropriate circuitry, e.g. oscillators, counters and the like, so that appropriate processes, such as integration and the like, can control the power applied to the load.

Figure 3B:
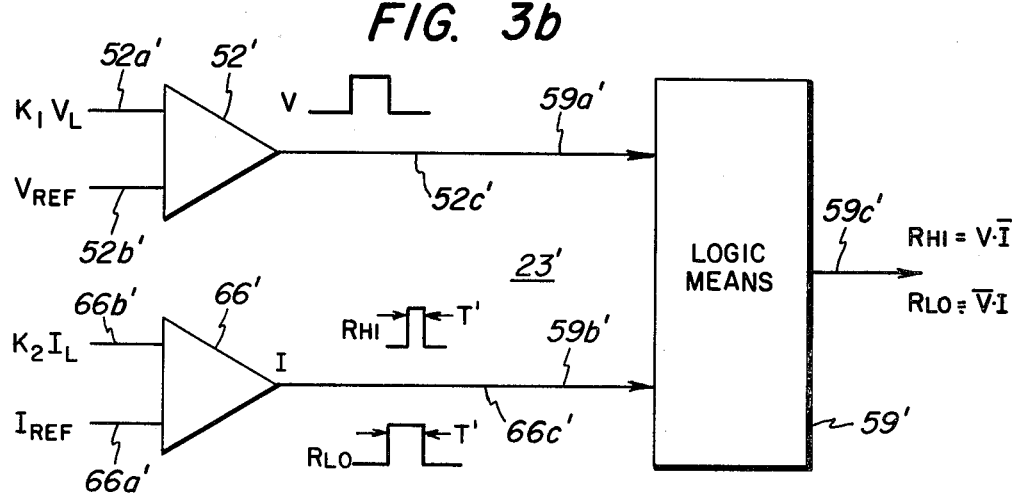

The discrete sampling resistance comparator means 23' of FIG. 3b may also be used to provide a variable-gain load comparison signal output controlling the load current (and therefore the load voltage and resistance). A comparator 52' provides a voltage V pulse at an output 52c' thereof, responsive to a comparison of a load voltage representation $K_1V_L$ at an input 52a' against a reference voltage at another input 52b'. Monostable multivibrator means 58 (of FIG. 3a) is not required, and the comparator output 52c' is connected directly to the first input 59a' of logic means 59'. The load current representation $K_2I_L$ is applied to an input 66b' of another comparator 66', having a current reference value applied to another input 66a', whereby the comparator output 66c' has a pulse formed thereat of pulse width T' for varying with the magnitude of the load resistance. The width of pulse T' will be wider than pulse V if the resistance of the load is lower than nominal and will be narrower than pulse V if the resistance of the load is higher than nominal. The variable width pulse is applied directly to the second logic means input 59b'. The logic means output 59c' signal combines (as a logical AND) the V signal, at input 59a', and the inverse of the I signal at input 59b', to determine if the load resistance is higher than nominal, and also combines (as a logical AND) the current signal I at input 59b' and the inverse of the voltage signal V at input 59a', to determine if the load resistance is lower than nominal. This discrete sampling resistance comparator means 23' is particularly useful in a variable gain circuit, as the charge added to or subtracted from the integration capacitor will be proportional to the output pulse width.

Referring now to FIGS. 4 and 4a-4f, another presently preferred embodiment 10' of my load parameter control circuit utilizes the discrete sampling resistance comparator means of FIG. 3b. Because of the variable widths of the voltage V pulse and the current I pulse, responsive to the magnitude of the deviation of $R_L$ from the desired value thereof, embodiment 10' is a variable gain configuration, rather than the fixed-pulse-width, fixed-gain configuration 10 of FIG. 1. As in the circuit of FIG. 2, wherein like reference designations are utilized for like elements, a first comparator circuit 32 is utilized to set the output 30a of a latch 30 at a source voltage waveform/load current zero crossing. The waveform at device 20 is coupled via a resistance 126 to the comparator input 34b, so that the flip-flop is set essentially at the load current zero crossing instant.

The load voltage comparator circuit 48' and load current comparator circuit 64' utilize a common reference voltage $V_R$, coupled to the inverting inputs 52b of second comparator 52 and input 66a of third comparator 66. A single reference divider 130, comprised of a first resistance 130a coupled between operating potential $+V$ and $V_R$ output, and a second resistance 130b coupled from the divider output to common ground, is utilized. It should be noted that separate references can be equally as well utilized, if the additional component count is believed warranted. The load-current-induced voltage across sensing resistor 24 is coupled via a resistor 132 to the non-inverting input 66b of third comparator 66. The reference voltage $V_R$ magnitude is selected in accordance with the voltage across resistor 24 at the normal value of load current $I_L$. A voltage divider 134 is then utilized to provide the proper proportion of the load voltage $V_L$ to the non-inverting input 52a of second comparator 52 to cause comparator 48' to change output state at substantially the same time as the output state of comparator 64', with the normal value of load voltage $V_L$ and with respect to the common reference potential $V_R$. Divider 134 includes a first resistance 134a coupled from input 52a to common ground and a variable resistance 134 coupled from node A to comparator input 52a. Thus, as in circuit 10, the values of load current sensing resistor 24, resistive divider 134 and reference divider 130 are scaled such that the voltage and current comparator circuits 48' and 64' are at their switching points at substantially the same time if the load resistance $R_L$ is correct. For example, if operating potential $+V$ is about 10 volts D.C., resistive divider 130 may be predeterminately established such that the reference voltage $V_R$ is about 129 millivolts. The current sensing resistance may be established at 0.05 ohms, such that during the first quarter-cycle of the source waveform, the increasing lamp voltage $V_L$ causes a peak current of about 3.536 amperes to flow through load 12 and sensing resistance, and this normal load current $I_L$ causes third comparator circuit 64' to have a logic 1 output level at the output 66c thereof during the period when the current is above 2.582 amperes. For a load which is a 24 volt, 60 watt lamp with a filament resistance $R_L$ of 9.6 ohms, the peak lamp voltage $V_L$ will be 33.941 volts and the lamp voltage divider 134 is set to decrease the lamp voltage to 129 millivolts at input 52a at a lamp voltage of 24.784 volts; the second comparator output 52c will then go to a logic 1 level at the same time as a logic 1 level appears at third comparator output 66c for this normal load resistance. Similarly, both comparator outputs 52c and 66c will fall to the logic 0 level during a decreasing voltage and current portion of the cycle at the same time if the load resistance is the nominal "normal" value, e.g. 9.6 ohms in the lamp example. The fractional portion of the operating potential chosen as a reference and therefore the point of sampling during the cycle is not critical. The values shown for this example are only for illustrative purposes.

The pulse-forming network 58 has been removed from between second comparator output 52c and inverter input 60a. Similarly, gate input 72a is now connected to the second comparator output 52c and the gate output 72c is connected to resistor 90 via a diode 140 and series resistor 142, rather than through transistors 78 and 86 and the associated circuitry of FIG. 1. Additionally, the integration capacitance 11 is formed of a first capacitor 11a connected to common ground through another capacitor 146 which latter capacitor is shunted by a discharge resistance 148. The junction between capacitors 11 and 146 is connected through a series diode 150 and series resistance 152 to node C, for providing a "rate feed forward" response.

If the load resistance $R_L$ is lower than desired (the left-hand condition in FIGS. 4a-4f), the current threshold will be crossed prior to crossing of the voltage threshold. The voltage $V_I$ at the third comparator output 66c (FIG. 4c) will rise to the logic 1 level at a time $t_a$ prior to the time $t_b$ at which second comparator output 52c voltage $V_V$ rises to the logic 1 level, due to the actual load current I exceeding the reference voltage $V_R$ level (FIG. 4a) before the actual load voltage V exceeds that reference level. Thus, the current comparator output voltage $V_I$ pulse 160 (FIG. 4c) goes to a logic 1 level at time $t_a$ and remains thereat until a time $t_d$; the voltage comparator output voltage $V_V$ is a logic 1 level pulse 162 (FIG. 4b) having a shorter duration, from time $t_b$ to time $t_c$. Both pulses 160 and 162 are substantially symmetrical about the current and voltage peak magnitudes.

Prior to time $t_a$, gate inputs 72b and 74a receive a respective $\overline{V_I}$ and $\overline{V_V}$ logic 1 levels while gate inputs 72a and 74b receive the respective $V_V$ and $V_I$ logic 0 levels, whereby gate output 72c (FIG. 4d) and gate output 74c (FIG. 4e) are both at the logic 1 level. Accordingly, transistor 82 is in the cut-off condition and diode 140 is reverse-biased, whereby charge is neither added to, nor taken from, capacitor 11. At time $t_a$, the $V_I$ voltage at gate input 74b rises to a logic 1 level, causing gate output 74c to fall to a logic 0 level and drive transistor 82 into saturation. Inverter output 70b falls to a logic 0 level, and remains thereat until the end of pulse 160. At later time $t_b$, the logic 1 pulse 162 appears at gate input 72a, but the gate output 72c is unaffected as remaining input 72b had already been driven to the logic 0 level; diode 140 remains reverse-biased. Inverter output 60b changes to a logic 0 level at time $t_b$ and drives gate output 74c back to the logic 1 level, again placing transistor 82 in the cut-off condition. Thus, in the time interval $t_a - t_b$, a first negative-going logic 0 level pulse 164a appears at gate output 74c and a first pulse 166a of current is added to capacitors 11. At time $t_c$, second comparator output 52c changes to a logic 0 level and gate input 74a receives a logic 1 level. As input 74b is still at the logic 1 level (due to the continued presence of pulse 160), the gate output 74c falls to the logic 0 level, until time $t_d$. The negative-going second pulse 164b also causes a second pulse 166b of current to be added to capacitors 11. Pulses 166 increase the voltage across capacitors 11 and cause an increased portion of each source cycle during which additional load current $I_2$ flows thereby increasing power to the lamp and raising its resistance. Ideally, the two capacitor-voltage-increasing pulses 166a and 166b are generated during each sampling half-cycle, provided that the lamp resistance does not change during that half-cycle.

If the load resistance $R_L$ is higher than desired (the right-hand condition in FIGS. 4a-4f), the voltage threshold will be crossed prior to crossing of the current threshold. The voltage $V_V$ at the second comparator output 52c (FIG. 4b) will rise to the logic 1 level at a time $t_a'$ prior to the time $t_b'$ at which third comparator output 66c voltage $V_I$ rises to the logic 1 level, due to the actual load voltage V exceeding the reference voltage $V_R$ level (FIG. 4a) before the sensed actual load current I exceeds that reference level. Thus, the voltage comparator output voltage $V_V$ pulse 168 (FIG. 4b) goes to the logic 1 level at time $t_a'$ and remains thereat until a time $t_d'$; the current comparator output voltage $V_I$ is a logic 1 level 170 (FIG. 4c) having a shorter duration, from time $t_b'$ to time $t_c'$. Again, both pulses 168 and 170 are substantially symmetrical about the current and voltage peak magnitudes. Prior to time $t_a'$, the gate outputs 72c and 74c are both at the logic 1 level, whereby capacitors 11 are neither charged nor discharged. At time $t_a'$, the $V_V$ voltage at comparator output 52c rises to the logic 1 level and causes gate output 72c to fall to the logic 0 level. Gate output 74c remains at the logic 1 level. Accordingly, transistor 82 remains cut off, while diode 140 is forward-biased and allows a discharge of current from capacitors 11. Gate output 72c remains at the logic 0 level until time $t_b'$ and the logic 0 level pulse 172a allows a pulse 174a of current to be discharged from capacitors 11. At time $t_b'$, the comparator 64' $V_I$ output 66c goes to the logic 1 level and remains thereat until time $t_c'$. This positive-going pulse 170 returns gate output 72c to the logic 1 condition, cutting off conduction in diode 140. At time $t_c'$, pulse 170 terminates and gate output 72c again falls to the logic 0 level, until time $t_d'$, when gate output 72c returns to the logic 1 level. The second negative-going pulse 172b allows another pulse 174b of current to be discharged from capacitors 11, lowering the voltage thereon. Responsive to the reduced voltage on capacitors 11, in response to the pulses 174, additional current $I_2$ flows for a shorter portion of each source waveform cycle, reducing the total load current and thus decreasing the load power; a reduction of power into a lamp load 12 reduces the resistance thereof.

It should be understood that the low and high load resistance conditions illustrated in FIGS. 2a-2f and 4a-4f are for situations wherein deviations from the desired load resistance are quite large, which situations are presented for purposes of illustrating operation of the load parameter control circuit. As the load resistance approaches the desired nominal value, in the steady state condition, the capacitor charging and discharging pulses 108, 110, 114 and 114' of FIG. 2f, and pulses 166 and 174 of FIG. 4f, become vanishingly narrow. Ideally, charge or discharge pulses are not present when the load input power is at the correct level to provide a desired load resistance. Where the load is a lamp, the lamp resistance is not constant over each half-cycle of the source waveform, as source resistance is related to the integral of the input power and also to the lamp time constant. The actual peak resistance (or lamp filament temperature) generally occurs sometime after a sinusoidal source waveform voltage peak, e.g. typically some 30° past the sine wave voltage peak of a lamp filament. Accordingly, a relatively narrow capacitor charging pulse is typically present in the first one-quarter cycle, with another narrow discharge pulse being present in the second quarter cycle, due to the lamp resistance being slightly lower than the desired resistance early in the half-cycle and slightly higher than the desired resistance later in the half-cycle. It will be seen that it is some "average" load resistance which is being controlled, which is a second order effect and becomes relatively insignificant as the filament thermal time constant becomes very large relative to the source cycle time period. It will also be seen that, because ideal comparators are not present, there will always be a small, but finite, input bias current in comparator 92, which is not inside the comparator loop and must be provided by current from the capacitors 11 charge or discharge pulses. The comparator input bias current thus supplied reduces the D.C. gain (itself due to the variable pulse width of the pulses charging and discharging capacitors 11) from infinity to some large, but acceptable, finite value.

As previously mentioned, a "rate feed forward" provision is provided by the use of a split capacitor 11, diode 150 and resistors 148 and 152. The rate-feed-forward circuit enhances response to sudden line voltage changes. Capacitor 146 will be charged to a voltage of polarity established by the polarity of rectifier 150, e.g. a negative-polarity voltage, and of magnitude established by the relative magnitudes of resistors 148 and 152. Thus, the negative-polarity voltage across capacitor 146 is of a magnitude equal to some fraction of the voltage across capacitor $C_1$, which is almost at line voltage. In steady-state operation, the voltage across capacitor 146 has essentially no effect upon the load parameter control logic, as the above-described operation will continue to change the charge in capacitor 11a until the voltage across the total capacitors 11 causes the switching device 20 "on" time to become as long as necessary to achieve the desired load resistance. In the event of a sudden increase in line voltage, the voltage across capacitor 146 will become more negative, immediately reducing the net voltage across integrating capacitors 11 and reducing the switching device "on" time to offset the increased line voltage effects. Similarly, a sudden reduction in line voltage will cause a sudden, more positive voltage across capacitor 146, suddenly increasing the net voltage across integrating capacitors 11 and increasing the switching device "on" time to offset the decreased line voltage. After several line waveform cycles, the control circuit has added or subtracted charge from capacitor 11a until the switching device "on" time becomes that necessary to achieve the desired resistance, whereupon the now-increased or now-decreased magnitude of voltage across capacitor 146 has no substantial effect.

Figure 5A:
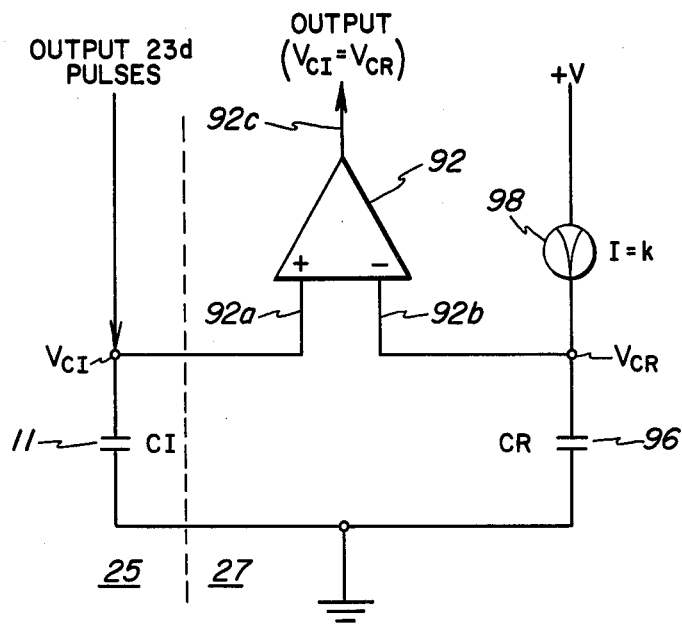
FIGS. 5a and 5b are somewhat generalized analog and digital comparator circuits, and useful in understanding several principles of the present invention.

Referring now to FIG. 5a, it will be seen that the integration means 25 (utilized in the foregoing analog implementations) adds or subtracts pulses of current to integration CI capacitor 11, to derive an integration voltage $V_{CI}$. The integral-to-control signal conversion means 27 utilized in the analog implementations, couples the integrator voltage $V_{CI}$ to one input 92a of analog comparator 92. The other input 92b of the analog comparator receives a reference ramp voltage $V_{CR}$ formed across the reference CR capacitor 96, responsive to introduction thereto of a substantially constant current (I=k) from a current source 98. The analog comparator output 92c changes state when the integration capacitance voltage $V_{CI}$ is equal to the reference capacitor voltage $V_{CR}$. This change of analog comparator output 92c level resets latch 30. In many uses, the integrating and reference ramp capacitors 11 and 96 are rather large, while the offset and leakage currents required by analog comparator 92 may prove to be undesirable, particularly at elevated temperatures. The use of capacitors 11 and 96, and an analog comparator 92, are preferably to be eliminated, particularly if the control circuit is to be formed at least in part as an integrated circuit chip.

Figure 5B:
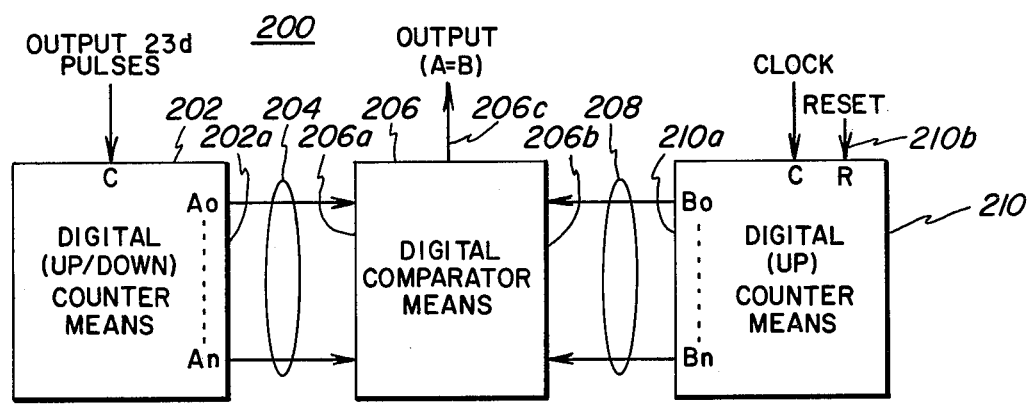

Referring now to FIG. 5b, one embodiment of a digital means 200 is illustrated for providing the control signal responsive to the pulses at the discrete sampling resistance comparator means output 23d, replacing integration means 25 and integral-to-control signal conversion means 27 of FIG. 1. The pulses from discrete sampling resistance comparator means output 23d are coupled to the clock C input of a first digital counter means 202, preferably of the controllable up/down counting type. The up/down counter bit $A_0$–$A_N$ outputs 202a thus provide a continuous representation of the net integration of resistance comparator output pulses. A multiplicity of lines 204 connect the up/down counter outputs 202a to a first input 206a of a digital comparator means 206. Another digital input 206b of the comparator is connected via a multiplicity of lines 208 to the $B_0$–$B_N$ bit outputs 210a of a digital up counter means 210. The clock C input of counter means 210 receives a clock signal of substantially constant frequency. The output 206c of the digital comparator will remain at a first level, e.g. a logic 0 level, when the first counter 202 digital output A digital count (which is a representation of load deviation from the desired magnitude) is less than or greater than the second counter 210 output B digital count (which increases in step-wise "ramp" fashion). Output 206c will be at a second level, e.g. a logic 1 level, only when the first and second counter digital outputs are equal, i.e. count A=count B. Thus, if latch means 30 (see FIG. 2 or 4) is set at the same time that counter 210 is cleared by a reset signal at a reset input 210b, the latch will be reset at a time governed by the clock frequency and the count contained in counter means 202. Power conditioning means 15 is thus enabled by output 206c for additional current flow dependent upon the digital count in counter means 202, responsive to the discrete sampling resistance comparator means output 23d pulses. By suitable choice of the comparator output 23d pulse rate and counter means 210 clock rate, elimination of analog and reference ramp capacitors and analog comparator can be accomplished.

Figure 5C:
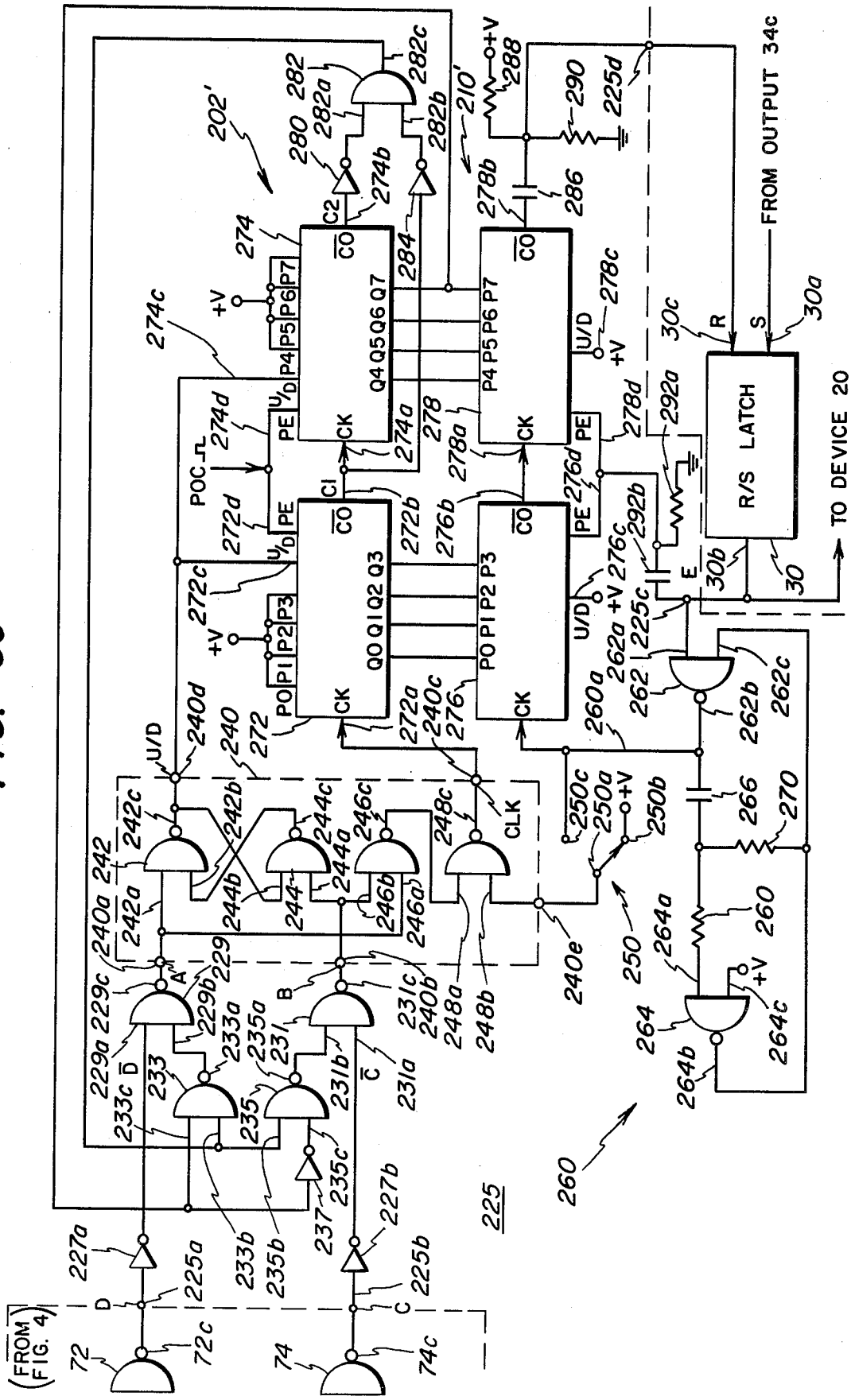
FIG. 5c is a schematic diagram of a presently preferred digital embodiment of a load resistance controller.

Referring now to FIG. 5c, a digital subcircuit 225, for replacement of integrator 25 and integral-to-control signal conversion means 27, is illustrated. Subcircuit 225 is a presently preferred embodiment, having a somewhat simplified digital structure relative to that of circuit 200 of FIG. 5b. Subcircuit 225 has a first input 225a receiving the negative-going discharge D signal at the output 72c of NAND gate 72 (FIG. 4) and a second input 225b receiving the negative-going charge C pulse signal from the output 74c of NAND gate 74. A third subcircuit input 225c receives the positive-going device 20 drive signal E at the R/S latch output 30d. A subcircuit output 225d is connected to the latch reset R input 30c.

Subcircuit 225 includes first and second inverter means 227a and 227b respectively having an input connected to the respective one of inputs 225a and 225b. The $\overline{D}$ signal at the output of inverter 227 is connected to a first input 229a of a two-input NAND gate 229. The $\overline{C}$ signal at the output of inverter 227b is connected to a first input 231a of another two-input NAND gate 231. It will be seen that, in practice, an integrated circuit (containing at least the digital logic for a load resistance control circuit) would combine each consecutive NAND gate and inverter combination, e.g. gate 72 and inverter 227a or gate 74 and inverter 227b, into an AND gate. The remaining inputs 229b and 231b of respective gates 229 and 231 are individually connected to the output of respective NAND gates 233 and 235, respectively. A first input 233b and 235b of gates 233 and 235 are connected together, while the remaining input 233c of gate 233 is connected to the input of a third inverter means 237, the output of which is connected to the remaining input 235c of gate 235. Gate output 229c is connected to the A input of a clock and up/down logic generator 240, having a second B input thereof connected to gate output 231c.

Clock and up/down generator 240 utilizes four two-input NAND gates 242, 244, 246 and 248. A first input 242a and 248a of the first and third gates 242 and 246 are tied together to the A input 240a. The remaining input 246b of gate 246 and a first input 244a of gate 244 are tied together to the generator circuit second input 240b. Gates 242 and 244 are wired as a set/reset latch with first gate second input 242b being wired to second gate output 244c and second gate second input 244b being wired to first gate output 242c. Third gate output 246c is connected to a first input 248a of the fourth gate, having its output 248c furnishing a clock CLK signal at generator circuit output 240c. The first gate output 242c is connected to another output terminal 240d, at which the up/down U/D signal appears. A third input 240e is connected to the remaining fourth gate input 248b, from the common terminal 250a of a single-pole, double-throw switch means 250. A first contactable terminal 250b of the switch means is connected to operating potential +V, while the remaining contactable switch means terminal 250c is connected to the output 260a of a free-running oscillator means 260.

Oscillator means 260, for supplying the clock pulses to the digital up counter means 210', utilizes first and second 2-input NAND gates 262 and 264. A first input 262a of gate 262 is connected to subcircuit input 225c, while the gate output 262b, at which oscillator output 260a is taken, is connected through a series capacitor 266 and resistor 268 to a first input 264a of second gate 264. The second gate output 264b is connected back to the remaining input 262c of the first gate and through a resistor 270 to the junction between capacitor 266 and resistor 268. The remaining second gate input 264c is connected to positive operating potential +V.

The digital up/down counter means 202' is an N-bit counter, where N is an integer selected to provide a desired resolution; illustratively, N=8 and counter 202 is formed of first and second 4-bit counters 272 and 274. Similarly, the digital up counter means 210' is also an N-bit counter; illustratively, this counter is formed by a series-connected pair of 4-bit counters 276 and 278 for the N=8 bit example. The clock CK input 272a of the lesser-significance up/down counter portion 272 is connected to clock generator output 240c. The carry-out CO output 272b thereof is connected to the clock CK input 274a of the greater-significance up/down counter portion 274. The carry-out $\overline{CO}$ output 274b thereof is connected through another inverting means 280 to a first input 282a of a two-input AND gate 282. The output 272b is also connected through an inverter means 284 to the remaining input 282b of gate 282. A logic-one gate output signal 282c is present whenever counter 202' is full and the U/D line is in the "up" mode or is empty and the U/D line is in the "down" mode. This signal is connected back to the parallelled gate inputs 233b and 235b. The preset inputs P0–P7 of both portions of counter 202' are connected to operating potential +V. The up/down U/D inputs 272c and 274c are connected in parallel to up/down generator circuit output 240d. The preset enable PE inputs of counters 272 and 274 are connected together to receive a power-on-clear POC signal, which is a positive pulse applied at each initialization of the load control circuit of which subcircuit 225 is a part. The POC signal initializes the counter outputs Q0–Q7 to the logic 1 level, as directed by the +V potential at preset inputs P0–P7. Each of up/down counter outputs Q0–Q7 is individually connected to an associated one of the up counter 210' preset inputs P0–P7. The connection of the up/down counter Q7 output and the up counter P7 input is also tied in parallel to the input of inverter means 237 and gate input 223c.

The clock CK input 276a of up-counter portion 276 is connected to the oscillator means output 260a. The first portion 276 carry-out $\overline{CO}$ output 276b is connected to the second portion clock CK input 278a. The second portion carry-out $\overline{CO}$ output 278b is connected through a coupling capacitance 286 to the junction of a pair of series resistors 288 and 290, themselves coupled between operating potential +V and ground potential. The junction between resistors 288 and 290 is coupled to subcircuit output 225d and the reset R input 230c of the latch. Resistors 288 and 290 are utilized to supply the proper level voltage to the latch means reset input 30c. The up-counter up/down U/D inputs 276c and 278c are both tied to operating potential +V, to lock the counters 276 and 278 in the up-counting-only mode. The preset enable PE inputs 276d and 278d are tied in parallel to a resistance 292a and through a capacitance 292b to subcircuit input 225c, at which the latch means 30 output signal E appears. Advantageously, CMOS 4029 type counter integrated circuits and the like are utilized for counter portions 272, 274, 276 and 278 if discrete integrated circuit implementation is used.

In operation, the count in up/down counter 202' is responsive to the resistance comparator output pulses. During a first source waveform half-cycle, latch 30 is set by comparator output 34c at the zero load voltage crossing, as explained hereinabove with respect to the circuit of FIG. 4. Upon being set, the latch output 30b rises and, with reference to subcircuit 225, causes the resistance comparator digital count in counter 202' to be loaded into up counter 210'. Simultaneously therewith, oscillator 260 is enabled and begins to increment counter 210 to a full count. Upon reaching the full count, counter 210' overflows and a change of state occurs at output 278b, resetting latch 30 and removing drive to device 20. During the next half-cycle of the source waveform, the resistance sampling process again occurs and a pulse is added to, or subtracted from, the count in counter 202', responsive to the state of the signals at the subcircuit inputs 225a and 225b. In the next subsequent half-cycle, the latch output is again enabled, counter 202' outputs are preset-enabled into counter 210' and counter 210' is again counted up to overflow, again resetting the latch output, at a time after the setting thereof determined by the count now in counter 202' and transferred into counter 210'.

More specifically, assume that the resistance of the load 12 has decreased, whereby an increased conduction period of device 20 is to be enabled. Responsive to load level parameter sampling, the resting logic 1 level at C inputs 225b is pulsed to the logic 0 level, while a logic 1 level continues at D input 225a. Therefore, a continuous logic 0 level and a logic 1 pulse respectively exist at respective gate inputs 229a and 231a. Accordingly, generator input 240a receives a logic 1 signal A level and generator input 240b receives a logic 0 pulse signal B input. The latch formed of gates 242 and 244 is set such that a logic 0 level appears at the generator U/D output 240d, controlling the counters 272 and 274 of up/down counter 202' to the down-counting mode. Simultaneously therewith, third gate output 246c is pulsed to the logic 1 level and then returns to the logic 0 level; responsive thereto, fourth gate output 248c falls to a logic 0 level and then returns to the logic 1 level, generating a positive-going edge at clock CLK output 240c, after the counter U/D inputs 272c and 274c have received the "decrement" logic 0 level from output 240d. The count in counter 202' is therefore decremented by one.

The decremented count remains in counter 202' until comparator output 34c sets latch output 30b. Responsive to the change to logic 1 level thereat, a logic 1 level pulse is provided to the preset-enable inputs 276d and 278d of the up-counter, transferring the decremented count from the Q0–Q7 outputs of counter 202' to counter 210' by means of the preset P0–P7 inputs of the up-counter. The logic 1 level at input 225c also enables oscillator 260, which continuously increments the count in counter 210' until that counter overflows and a pulse is generated at output 278b. This pulse is coupled to latch reset R input 30c, causing the latch output 30b to fall to the logic 0 level, turning off device 20 and oscillator 260.

Similarly, if the signal at the D input 225a had been a negative-going pulse (while the C input 225b level remained at a logic 1 level) the U/D output 240d would have been set to the logic 1 (up-counting level, while the CLK output 240c was at the logic 0 level. At the positive-going, trailing edge of the pulse at input 225a, CLK output 240c would have generated a positive-going clock signal, incrementing counter 202' and decreasing the time interval during which device 20 would conduct, responsive to a determination that the load resistance was higher than the predetermined magnitude.

Responsive to the next subsequent resistance sample, the count in up/down counter 202' will be either incremented or decremented, dependent upon the load resistance magnitude. It will be seen that there is a "sense"-reversal in this simplified implementation relative to the digital-comparator implementation of FIG. 5b. Accordingly, counter 210' is caused to count upward to overflow from a preset starting point to obtain the pulse for resetting latch 30, rather than counting in an upward direction from zero to coincidence with the count in counter 202'. It will be seen that the choice of sense is arbitrary and that either up or down counting can be equally as well utilized.

In the analog approach, the power supply voltages established the maximum voltages to which the integrating capacitor can be charged. In the digital approach, the digital counter 202' can "flip" from an all-ones count to an all-zeros count or vice-versa, responsive to a single clock input pulse, when the counter is at the full or empty condition, respectively. This situation must be prevented to preclude switching from minimum to maximum load current, or vice versa, when additional increases or decreases are required and the counter is already full or empty. Thus, clock pulses should be applied to increment counter 202' only when the D input 225a receives a negative-going comparator pulse output, but if register 202 is not full. Register 202' will be full when the first and second portion carryout signals C1 and C2 are present, and the most significant bit Q7 output is also present. Accordingly, the generator A input 240a is only to receive a negative-going pulse if the D input 225a receives such a pulse and, in addition, one of the C1 and C2 outputs are high or the Q7 output is low. Thus, the A input will be negatively pulsed when the D input is negatively pulsed unless the Q7 output is up while both carriers C1 and C2 are down, in which case the A input will stay up and not respond to any change in the D input, i.e. a clock pulse will not be generated to cause an up-count if the counter is full. Thus, in standard Boolean notation:

$$A = D + \overline{Q7} \; \overline{C1} \; \overline{C2}.$$

Similarly, counter 202' is to count down if C input 225b receives a negative-going pulse, only if the register is not empty, i.e. output Q7 is not at a logic 0 level when the first and second portion carry signals C1 and C2 are logic 0 levels. Thus, a down-counting clock pulse will be prevented, when the counter is empty, if the B input to circuit 240 is given by the Boolean expression:

$$B = C + \overline{Q7} \; \overline{C1} \; \overline{C2}.$$

The counter underflow and overflow prevention circuit includes gates 229, 231, 233, 235 and 282, plus inverters 237, 280 and 284. Gate output 282c is at the logic 1 level only when an overflow or underflow condition is not about to occur, i.e. the C1 and C2 signals are both at the logic 0 level. The Q7 counter output is applied to gate input 232c, while the inverse thereof is applied to gate input 235c, with remaining gate inputs 233b and 235b receiving the gate 282c output level. Thus, if C1 and C2 are both down (which occurs if the counter is configured for up-counting and the counter is full, or if the counter is configured for down-counting and the counter is empty) this is indicative that on the next count the Q outputs of counter 202' will change from all ones to all zeros counting up or from all zeros to all ones if counting down, and the Q7 bit is checked. If the Q7 bit is at a logic 1 level while both C1 and C2 are at the logic 0 level, the counter is full and no further up-counting is to be allowed. Similarly, if the Q7 output is at a logic 0 level with C1 and C2 also at logic 0 levels, the counter is empty and further down-counting is to be inhibited. In the first case gate 229 is disabled to inhibit up-counting, while in the second case gate 231 is inhibited to prevent further down-counting.

It should be understood that the foregoing illustrative example utilizes one particular type of counter integrated circuit; if different counter integrated circuits are utilized, the logic implementation of digital comparator 225 may vary somewhat. It will also be seen that this implementation has been described with switch means 250 set such that common terminal 250a is connected through terminal 250b to a positive logic potential, whereby the count in up/down counter 202' can change by only one count for each resistance sample. This is particularly advantageous when used with the gated oscillator means 260, which clock oscillator is thus synchronized with the line zero crossing to eliminate a one-count ambiguity due to jitters resulting from lack of synchronization. If one-count jitter is not a problem in a particular load resistance control application, clock oscillator 260 may be left running, by connection of gate input 262a to a positive logic potential. The clock oscillator frequency is not particularly critical, with the upper limit thereof being established by the number N of stages in the counter divided by the maximum delay time required. However, to maximize resolution for a given number N of counter stages, the clock frequency should be as high as possible. A variable gain implementation, wherein the number of counts added to or subtracted from the count in up/down counter 202' is a function of the pulse width of the D or C pulse at inputs 225a or 225b, is provided by setting switch means 250 such that common terminal 250a is connected to selectable terminal 250c. With switch 250 so set, each negative-going input pulse provides a number of clock oscillator 260 output pulses through gate 248 to the up/down counter clock input, with the number of oscillator pulses being determined by the resistance comparator output pulse width. This variable-gain option may be desirable in certain applications requiring a more rapid response to large load resistance changes.

While several embodiments of my novel load parameter control circuit have been described in detail herein, and especially for providing incandescent lamp filament temperature control, many variations and modifications will now become apparent to those skilled in the art. Thus, it will be immediately seen that, while described with respect to a load lamp filament resistance control application, the load parameter control circuit of the present application is applicable to many systems in which A.C. power is applied to a load and in which control of the load power can be effected by varying the "on" time of some component in the power control circuit. Further, application to essentially D.C. systems can be provided by intermittently interrupting the D.C. power to form pulses as the voltage and/or current vary through the threshold points of the comparators of my novel apparatus. It is my intent, therefore, to be limited only by the scope of the appending claims and not by the details and/or instrumentalities presented by way of example herein.

What is claimed is:

1. A circuit for controlling the resistance of a load having a non-zero resistance temperature coefficient and receiving energy from an electrical source, comprising:
   means connected between said source and said load for varying the temperature of said load by adjustment of the magnitude of periodic current pulses flowing through said load responsive to a control signal;
   means for monitoring the resulting voltage pulse across said load to provide a first pulse signal;
   means for monitoring the current pulse flowing through said load to provide a second pulse signal;

comparison means, receiving said first and second pulse signals and first and second substantially-constant reference signals, for providing an output signal having a characteristic indicative of the time at which the magnitude of said first pulse signal exceeds the magnitude of the first reference signal with respect to the time at which the magnitude of said second pulse signal exceeds the magnitude of the second reference signal; and means for providing said control signal responsive to said comparison means output signal to cause the load current pulse magnitude and said load temperature to vary in a manner to cause said resistance to be maintained at a substantially constant, predetermined value.

2. The circuit of claim 1, wherein said comparison means includes a first comparator having a first input receiving said first pulse signal and a second input receiving said first reference signal, said first comparator having an output changing state whenever the magnitude of said first pulse signal exceeds the magnitude of said first reference signal.

3. The circuit of claim 2, wherein said comparison means further includes a second comparator having a first input receiving said second signal pulse, a second input receiving said second reference and an output changing state whenever the magnitude of said second pulse signal exceeds the magnitude of said second reference signal.

4. The circuit of claim 3, wherein said first and second reference signals are the same reference signal.

5. The circuit of claim 3, wherein said comparison means further includes logic means having first and second inputs respectively coupled to an associated one of said first and second comparator outputs for providing said comparison means output signal as a substantially constant level when transitions in said first and second comparator output states occur at substantially the same time and for providing said comparison means output signal as a pulse in one of first and second directions responsive to a selected one of said first and second comparator outputs changing state in a predetermined direction prior to the change of state of the other comparator output.

6. The circuit of claim 5, further comprising monostable multivibrator means for generating a pulse of a predetermined duration at the logic means first input, responsive to a state change at said first comparator output.

7. The circuit of claim 5, wherein said logic means includes first and second NAND gates each having first and second inputs and an output, a first input of each of said first and second gates being coupled to said first logic means input; a second input of said first gate being coupled to said second logic means input; inverting means coupled between said logic means second input and said second gate second input; and means coupled to the gate outputs for providing a pulse of different characteristics dependent upon a changed state in one of said first and second gate outputs.

8. The circuit of claim 7, wherein said control signal providing means includes an integrating element receiving the pulses from said logic means for providing a voltage of magnitude dependent upon the magnitude of said load resistance.

9. The circuit of claim 1, wherein said control signal providing means includes means for integrating the output signal from said comparison means; and means for converting the integrated comparison means output signal to said control signal.

10. The circuit of claim 9, wherein said integrating means includes an integrating capacitance having a voltage thereacross responsive to changes in the characteristic of the comparison means output signal.

11. The circuit of claim 10, wherein said converting means includes a latch having a set input, a reset input and an output controllable to first and second states responsive to a signal respectively at said set input and said reset input; means for providing a set input signal when the current through said load is at a predetermined magnitude; and means for providing a reset input signal at a time after the occurrence of an immediately-previous set input signal, dependent upon the magnitude of the integrating means voltage.

12. The circuit of claim 11, wherein said reset signal providing means includes means for providing a voltage ramp waveform, initiated at the occurrence of each set input signal; and a comparator receiving said integrating means voltage and said ramp waveform for generating, after an immediately-previous set input signal, said reset signal when said ramp waveform voltage increases to the magnitude of said integrator means voltage.

13. The circuit of claim 12, further including means for resetting the ramp waveform to an initial value after a reset signal has been generated and before the next set input signal is received.

14. The circuit of claim 10, wherein said source is an AC source and said set input signal providing means includes means for providing a set input signal at selected zero crossings of the waveform of said source.

15. The circuit of claim 10, further providing rate-feed-forward means for causing the integrated voltage to respond with increased speed responsive to sudden changes in the voltage from said source.

16. The circuit of claim 15, wherein said integrating means comprises first and second series-connected integrating capacitors; and said rate-feed-forward means includes means connected between said source and the junction of said integrating capacitances for varying the instantaneous voltage across one of said integrating capacitances in a direction, opposite to the direction of voltage change across the remaining capacitance responsive to a comparison means output change, responsive to said sudden source voltage change.

17. The circuit of claim 1, further comprising means connected to said comparison means for introducing an amount of hysteresis therein sufficient to prevent variations of said load current in opposite directions when said load resistance is substantially at said predetermined value.

18. The circuit of claim 1, wherein said comparison means output signal contains at least one pulse in one of first and second directions responsive to the deviation of the magnitude of said load resistance from said predetermined value; and said control signal providing means includes up/down counter means for counting the number of comparison means output pulses, the count in said up/down counter means respectively increasing and decreasing for pulses of first and second opposite polarities; means for providing a clock signal; counter means periodically reset to an initial count for counting the number of clock pulses after each resetting; and means for comparing the counts in said up/down counter means and said counter means for providing a sequence of periodic output signals, each output signal having a duration beginning substantially at the resetting of said counter means and terminating upon the count in said counter eans being equal to the count in said up/down counter means; said current varying means being responsive to the duration of each of said periodic output signals by varying the current flowing through said load responsive thereto.

19. The circuit of claim 18, wherein said source is an AC source, and further including means for resetting said counter means at selected zero crossings of the waveform of said source.

20. The circuit of claim 1, wherein said comparison means output signal contains at least one pulse in one of first and second directions responsive to said load resistance being one of greater than and less than said predetermined value; and said control signal providing means includes: up/down counter means for counting, in one of incremental and decremental manners responsive to first and second states of an up/down signal, the number of pulses received at an input thereof; oscillator means for providing a periodic signal; means receiving said comparison means output signal for providing a respective one of said up/down control signal first and second states responsive to the magnitude of said first signal exceeding the magnitude of said first reference signal respectively before and after the magnitude of said second signal exceeds the magnitude of said second reference signal; means receiving said oscillator means periodic signal for providing a clock signal to said up/down counter means each time said comparison means output signal characteristic changes; means for unidirectionally-counting said oscillator means signal from an initial count preset to said up/down counter means count; and means for providing said current varying means with a control signal having a duration established by the time required for said counter means to count from said preset initial count to one of underflow and overflow states; said current varying means responsive to the time duration of the control signal received thereby for adjusting the current flowing through said load resistance.

21. The circuit of claim 20, further comprising means coupled to said up/down counter means for preventing continued incremental counting therein when said up/down counter means is full and for preventing continued decremental counting therein said up/down counter means is empty.

22. The circuit of claim 20, wherein said source is an AC source and said oscillator means is enabled at selected zero crossings of the waveform of said source, said oscillator means being disabled substantially when said counter means reaches the associated one of said overflow and underflow states.

23. The circuit of claim 20, further including means for gating the oscillator means periodic signal as the clock signal to said up/down counter means for the duration of a change in the characteristic of said comparison means output signal.

24. A method for controlling the resistance of a load having a non-zero resistance temperature coefficient and receiving pulses of energy from an electrical source, comprising the steps of:

(a) sampling the voltage pulse across and the current pulse flowing through the load to provide respective first and second pulsed monitoring signals;
(b) providing first and second substantially-constant reference signals;
(c) providing a first comparison pulse signal whenever the load voltage first pulsed monitoring signal exceeds the first reference signal;
(d) providing a second comparison pulse signal whenever the load current second pulsed monitoring signal exceeds the second reference signal; and
(e) varying the load current, in a respective one of opposite first and second directions responsive to one of the first and second comparison pulse signals having a time duration respectively one of greater than and less than the time duration of the remaining one of the first and second comparison pulse signals, to vary the load temperature and cause said load resistance to be maintained at a substantially constant, predetermined value.

25. The method of claim 24, wherein step (b) includes the step of setting the first and second reference signals equal to each other.

26. The method of claim 24, wherein step (e) includes the steps of: providing a charge storage element; adding charge to the charge storage element if the time duration of said first comparison pulse signal is greater than the time duration of said second comparison pulse signal; removing charge from the charge storage element if the time duration of the second comparison pulse signal is greater than the time duration of the first comparison pulse signal; and varying the load current responsive to the voltage across the charge storage element.

27. The method of claim 26, wherein step (e) further comprises the steps of: establishing a minimum load current; providing a voltage ramp periodic waveform; comparing the voltage across the charge storage element with the ramp waveform voltage; and enabling additional current flow through said load from the start of said ramp waveform until said storage element voltage and said ramp waveform voltage are substantially equal.

28. The method of claim 24, wherein step (e) further comprises the steps of: counting the difference between the time durations of said first and second comparison pulse signals in respective first and second directions responsive respectively to said first comparison pulse signal having a time duration respectively greater than and less than said second comparison pulse signal time duration; periodically resetting the count in a unidirectionally-counting counter; thereafter presetting the count in the unidirectionally-counting counter to the count in the bidirectionally-counting counter; providing a substantially constant first load current; causing the unidirectionally-counting counter, after presetting, to count in one of incremental and decremental directions; and causing an additional flow of load current commencing when said unidirectionally-counting counter commences to count and terminating when the unidirectionally-counting counter reaches an associated one of overflow and underflow conditions.

* * * * *